United States Patent [19]

Emericks et al.

[11] Patent Number: 6,119,090
[45] Date of Patent: Sep. 12, 2000

[54] SUBSCRIBER LINE INTERFACE CIRCUIT WHICH AUTOMATICALLY ADJUSTS THE SIGNAL HEADROOM ON A TELEPHONE LINE AND A METHOD OF DOING THE SAME

[75] Inventors: Anders Emericks; Henrik Hellberg, both of Solna; Mattias Israelsson; Carl-Henrik Malmgren, both of Stockholm, all of Sweden

[73] Assignee: Telefonaktiebolaget LM Ericsson (publ), Stockholm, Sweden

[21] Appl. No.: 09/089,499

[22] Filed: Jun. 3, 1998

[30] Foreign Application Priority Data

Jun. 6, 1997 [SE] Sweden .................................. 9702174

[51] Int. Cl.⁷ .................................................. H04M 19/00
[52] U.S. Cl. ............................................ 704/399; 704/402
[58] Field of Search ..................................... 379/399, 398, 379/402, 413, 377

[56] References Cited

U.S. PATENT DOCUMENTS

| 4,002,852 | 1/1977 | Martin | 379/395 |
| 4,853,959 | 8/1989 | Johansson | 379/413 |
| 5,329,588 | 7/1994 | Willocx et al. | 379/413 |
| 5,485,516 | 1/1996 | Hauptmann | 379/413 |
| 5,511,118 | 4/1996 | Gores et al. | 379/399 |
| 5,694,465 | 12/1997 | Apfel | 379/377 |
| 5,848,149 | 12/1998 | Chen et al. | 379/399 |
| 5,872,842 | 2/1999 | Daly et al. | 379/399 |

*Primary Examiner*—Richemond Dorvil
*Attorney, Agent, or Firm*—Nixon & Vanderhye P.C.

[57] ABSTRACT

In a subscriber line interface circuit connected to a two-wire telephone line (A and B lines) for transmitting AC signals, one of the wires (e.g., the A line) is set to a DC voltage lower (i.e., more negative) than a first DC voltage (GND), while the second wire (e.g., the B wire) is set to a DC voltage lower than the DC voltage of the first wire, but higher than a second DC voltage (VREG). A first voltage generator is provided for setting a first threshold voltage (VTHA) between the first DC voltage (GND) and the DC voltage of the first wire. A second voltage generator is provided for setting a second threshold voltage (VTHB) between the second DC voltage (VREG) and the D voltage for the second wire. The first and second threshold voltages are utilized for transmission and reception of AC signals on the respective A and B wires. As long as the instantaneous value (VA) of the signal on the first wire (A) equals the first threshold voltage (VTHA) and/or the instantaneous value (VB) of the signal on the second wire (B) equals the second threshold voltage (VTHB), the subscriber line interface circuit automatically adjusts the signal headroom to the actual amplitude of the AC signals by controlling the voltage difference (VA) between the first DC voltage (GND) and the DC voltage of the first wire (A) and/or the voltage difference (VB) between the DC voltage of the second wire (B) and the second DC voltage (VREG).

10 Claims, 2 Drawing Sheets

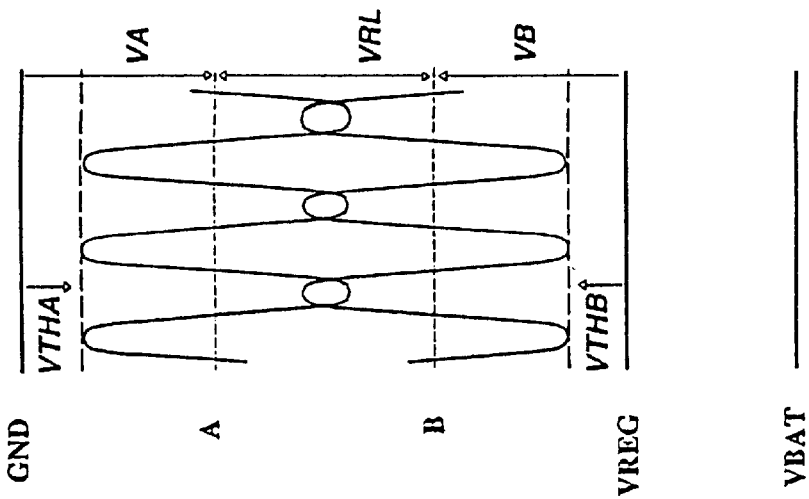
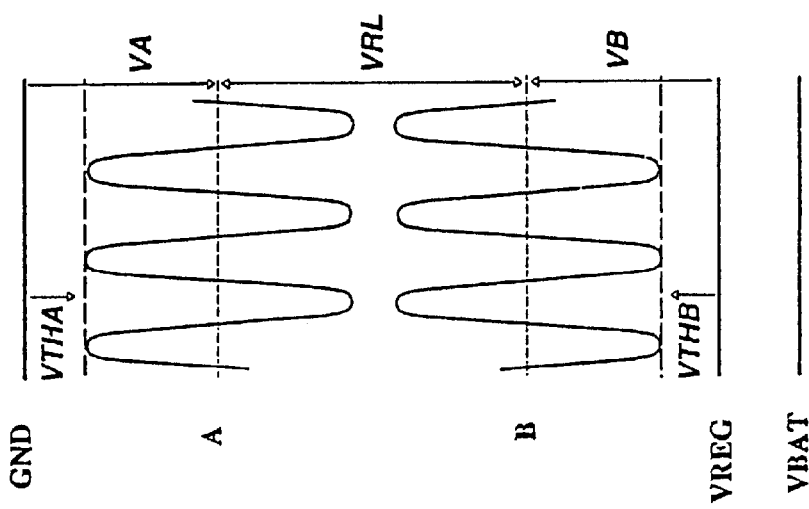
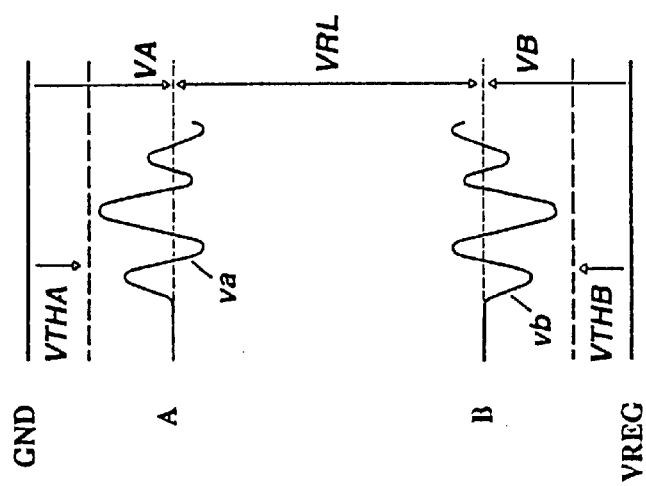

SUBSCRIBER LINE INTERFACE CIRCUIT WHICH AUTOMATICALLY ADJUSTS THE SIGNAL HEADROOM ON A TELEPHONE LINE AND A METHOD OF DOING THE SAME

TECHNICAL FIELD

The invention relates generally to subscriber line interface circuits and, more specifically, to a method and an arrangement in a subscriber line interface circuit for automatically adapting the signal headroom on a telephone line to be connected to the subscriber line interface circuit to changes in the amplitude of the AC signals that are transmitted on the telephone line.

BACKGROUND OF THE INVENTION

The purpose of a subscriber line interface circuit is, inter alia, to supply a two-wire telephone line with DC voltage and to transmit AC signals on the telephone line. The DC voltage shall drive a telephone or other equipment connected to the other end of the two-wire circuit, while the AC signals can be, for example, speech, number information, and private rate measurement (PRM) signals, the latter being high-frequency signal bursts that can appear at any time during a call.

The subscriber line interface circuits are so designed that a certain portion of the available battery voltage is intended for the generation of a predetermined line feed characteristic, while another portion of the battery voltage is intended for the transmission of AC signals. This latter portion is called signal headroom. Thus, the signal headroom puts a limit on the amplitude of the AC signals to be transmitted.

The PRM signals mentioned above are high-amplitude signals. Also, other high-amplitude signals may appear. To accomodate such signals, the known solutions have been either to have a constant, high signal headroom or to increase the signal headroom when "extra" signal headroom is needed, e.g. for the PRM signals. In the first case, the line interface circuits are more or less earmarked for PRM applications since more signal headroom is, in fact, reserved than what is actually needed for normal AC transmission. In the second case, control means, external to the line interface circuit, have to be provided to change the signal headroom when necessary.

SUMMARY OF THE INVENTION

The object of the invention is to bring about a subscriber line interface circuit which automatically adapts the available signal headroom to the instantaneous AC signal amplitude situation.

This is attained by means of the subscriber line interface circuit according to the invention in that the voltage difference between the voltage of the respective wire of the two-wire telephone line and the associated supply voltage is made smaller or larger in response to AC signal amplitude changes.

Thus, the signal headroom will adapt itself to the AC signal amplitude situation. Hereby, the subscriber line interface circuit will be more universal and no control means, external to the line interface circuit, will be needed.

BRIEF DESCRIPTION OF THE DRAWING

The invention will be described more in detail below with reference to the appended drawing, on which FIG. 2 is a diagram illustrating voltage levels and AC signals under normal operating conditions of the circuit in FIG. 1, and FIGS. 3 and 4 illustrate two different embodiments of how the circuit in FIG. 1 controls voltage levels in response to AC signals of amplitudes exceeding a limiting value.

PREFERRED EMBODIMENTS

Figure 1:
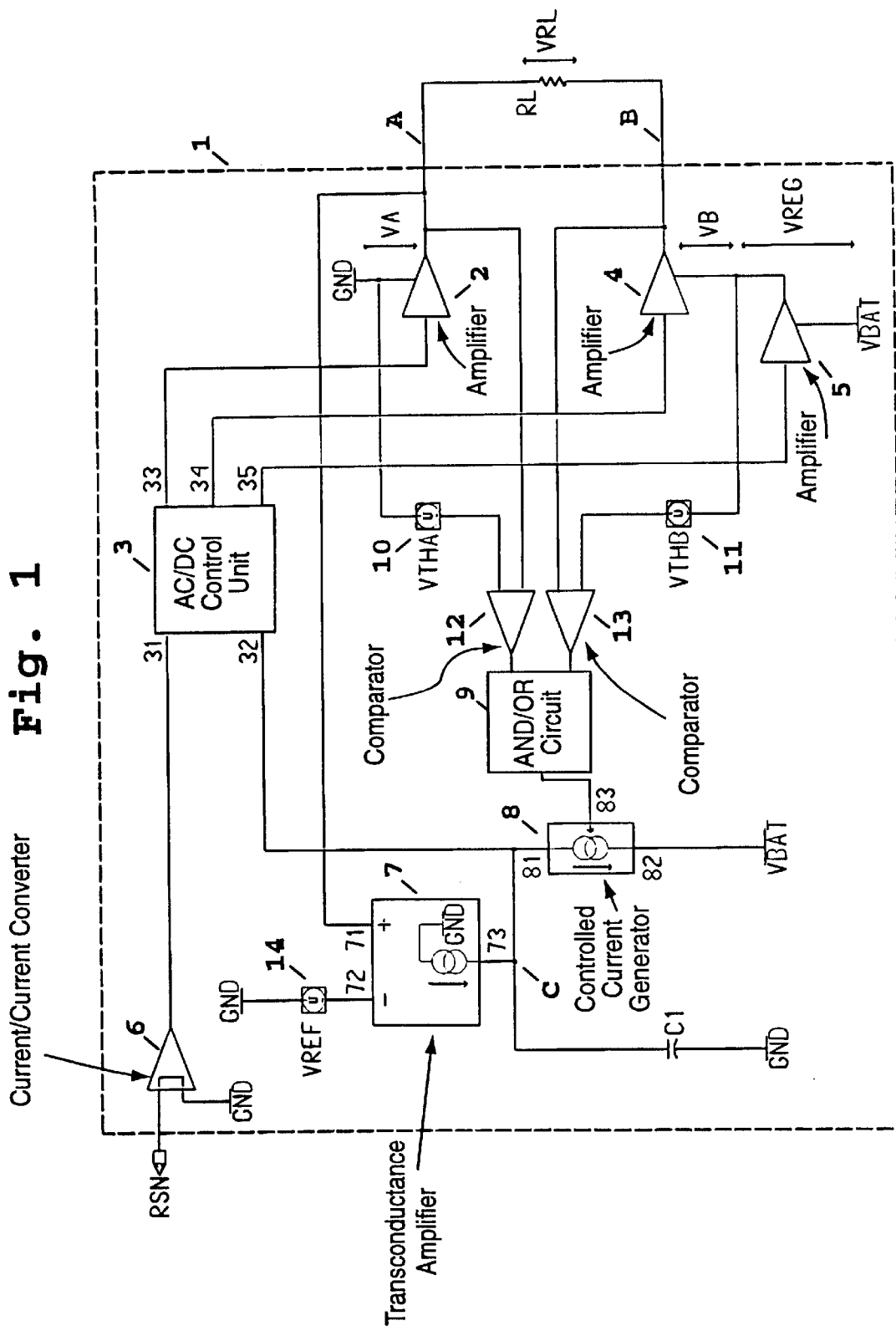
FIG. 1 is a block diagram of an embodiment of a subscriber line interface circuit according to the invention.

FIG. 1 shows an embodiment of a subscriber line interface circuit 1 according to the invention. It should be pointed out that only those elements of the line interface circuit that are necessary for the understanding of the invention, are shown.

The subscriber line interface circuit 1 is, in a manner known per se, connected to the A-wire and the B-wire (or tip wire and ring wire, respectively) of a two-wire telephone line connected, for example, to a telephone set (not shown). The resistance of the telephone set and the telephone line is represented by a resistor RL in FIG. 1 and the voltage across the resistor RL, i.e. the line voltage, is denoted VRL.

The A-wire is connected to the output terminal of an amplifier 2 whose input terminal is connected to an output terminal 33 of an AC/DC control unit 3. The supply voltage terminal of the amplifier 2 is connected to a supply voltage which, in the embodiment shown, is supposed to be ground GND. However, it should be understood that the supply voltage terminal of the amplifier 2 does not necessarily have to be connected to ground GND but can be connected to any desired supply voltage depending upon the application in question.

The B-wire is connected to the output terminal of an amplifier 4 whose input terminal is connected to an output terminal 34 of the AC/DC control unit 3. The supply voltage terminal of the amplifier 4 is connected to the output terminal of an amplifier 5 whose input terminal is connected to an output terminal 35 of the AC/DC control unit 3. The supply voltage terminal of the amplifier 5 is connected to a supply voltage VBAT which, in the embodiment shown, is supposed to be equal to −48 V. The supply voltage of the amplifier 4, i.e. the output voltage of the amplifier 5, is denoted VREG in FIG. 1 and will be described below.

In the embodiment according to FIG. 1, the AC/DC control unit 3 is supposed to set the A-wire to a higher DC voltage VA than the DC voltage VB on the B-wire. The DC voltage VA on the A-wire is lower than the DC supply voltage of the amplifier 2, i.e. ground GND, while the DC voltage VB on the B-wire is higher than the supply voltage of the amplifier 4, i.e. VREG. This is schematically illustrated in the diagram in FIG. 2.

The AC/DC control unit 3 has two input terminals, namely an AC input terminal 31 and a DC input terminal 32.

The AC input terminal 31 is connected to the output terminal of a current/current converter 6 whose input terminal is connected to a receiver summing node RSN of the subscriber line interface circuit 1. Speech, number information, PRM signals and other AC signals are supplied to the receiver summing node RSN and applied via the current/current converter 6 to the AC input terminal 31 of the AC/DC control unit 3 which is adapted to apply these AC signals to the A-wire and the B-wire via the amplifiers 2 and 4, respectively.

The DC input terminal 32 of the AC/DC control unit 3 is connected to a node C which is connected to ground GND via a capacitor C1. The node C is also connected to the current output terminal 73 of a transconductance amplifier 7 which has two voltage input terminals 71 and 72, and to the input terminal 81 of a controlled current generator 8 whose output terminal 82 is connected to the supply voltage VBAT and whose control input terminal 83 is connected to the output terminal of an AND/OR circuit 9 to be described below.

The voltage input terminal 71 of the transconductance amplifier 7 is connected to the A-wire, while a voltage generator 14 is connected between ground GND and the voltage input terminal 72 of the transconductance amplifier 7. The voltage generator 14 is adapted to generate a voltage VREF in correspondence to the desired DC voltage VA on the A-wire.

The DC input terminal 32 of the AC/DC control unit 3 senses the voltage in the node C and the AC/DC control unit 3 controls the amplifiers 2, 4 and 5 in response to the sensed voltage via the output terminals 33, 34 and 35, respectively.

The transconductance amplifier 7 is adapted to compare the voltage VA on the A-wire on its input terminal 71 with the voltage VREF on its input terminal 72 and supply current to or draw current from the node C if VA≠VREF.

As stated above, the AC/DC control unit 3 senses the voltage in node C on its input terminal 32 and, in response hereto, controls the amplifier 2 via its output terminal 33 so that VA=VREF. Via its output terminal 35, the AC/DC control unit 3 is adapted to control the amplifier 5 such that the voltage VREG on its output terminal, i.e. the supply voltage of the amplifier 4, becomes higher than the supply voltage VBAT by a certain amount. The AC/DC control unit 3 is also adapted to control the amplifier 4 via its output terminal 34 so that the voltage VB, i.e. the voltage between the B-wire and the voltage VREG, equals the voltage VA, i.e. the voltage between the A-wire and ground GND, in the embodiment shown.

If, for some reason, VA>VREF, the transconductance amplifier 7 supplies current to the node C. Thus, the voltage increases in node C. This increase is sensed, via the input terminal 32, by the AC/DC control unit 3 which controls the amplifiers 2, 4 and 5 to decrease the voltages VA and VB. The voltage VREG, i.e. the supply voltage of the amplifier 4, will increase in correspondence to the sum of the decreases of the voltages VA and VB.

If, for some reason, VA<VREF, the opposite process takes place.

In accordance with the invention, to guard the amplifiers 2 and 4 against the risk of being saturated when transmitting AC signals onto the A-wire and B-wire, respectively, two voltage generators 10 and 11 are provided to define threshold voltages VTHA and VTHB, safely above and below, respectively, the saturation voltages of the amplifiers 2 and 4 as schematically illustrated in FIG. 2. In FIG. 2, the threshold voltages VTHA and VTHB are supposed to be of the same value, but it is to be understood that, in some applications, they do not necessarily have to be of the same value.

In FIG. 1, the voltage generator 10 is connected between the supply voltage terminal of the amplifier 2, i.e. ground GND, and one input terminal of a comparator 12 whose other input terminal is connected to the A-wire. The voltage generator 11 is connected between the supply voltage terminal of the amplifier 4, i.e. the voltage VREG, and one input terminal of a comparator 13 whose other input terminal is connected to the B-wire.

The output terminals of the comparators 12 and 13 are connected to respective input terminals of the AND/OR circuit 9.

For the following description, it is supposed that the A-wire and the B-wire form a balanced two-wire connection. Thus, an AC signal applied to the A-wire will appear in anti-phase on the B-wire as illustrated in FIG. 2.

To simplify the description, only AC signals on the A-wire will be considered, since the AC signals on the B-wire will be identical but in anti-phase.

When AC signals are applied, either from the receiver summing node terminal RSN or directly via the balanced two-wire connection, the comparator 12 is, thus, adapted to compare the instantaneous value of the signal on the A-wire, i.e. va, with the threshold voltage VTHA set by the voltage generator 10 for the A-wire.

As long as va, i.e. the instantaneous value of the signal on the A-wire, is below VTHA, the subscriber line interface circuit 1 will remain in the state illustrated in FIG. 2.

If the amplitude of the AC signal increases, e.g. due to transmission of speech or PRM signalling, so that the instantaneous value of the signal on the A-wire equals the threshold voltage VTHA, i.e. va=VTHA, the subscriber line interface circuit 1 according to the invention, is adapted to automatically increase the available signal headroom to accomodate the increased AC signal amplitude.

The increased AC signal amplitude is detected by the comparator 12 in that va=VTHA. The comparator 12 will supply an output signal to the AND/OR circuit 9, which output signal will be forwarded by the OR-portion of the circuit 9 to the control input terminal 83 of the controlled current generator 8. The signal from the AND/OR circuit 9 will control the current generator 8 to draw current from the node C to VBAT. Thus, the voltage will be reduced in the node C.

This reduced voltage in node C will be sensed by AC/DC control unit 3 via its input terminal 32. This causes the AC/DC control unit 3 to increase the DC voltage VA on the A-wire via the amplifier 2. Of course, the DC voltage VB on the B-wire will be increased accordingly via the amplifier 4.

This situation can be handled in two different ways by the subscriber line interface circuit 1.

According to a first embodiment, the AC/DC control unit 3 is adapted to reduce the voltage VREG via the amplifier 5 in correspondence to the sum of the increases of the voltages VA and VB. Hereby, the line voltage VRL will be kept constant. This embodiment is schematically illustrated by the diagram in FIG. 3.

According to a second embodiment, the AC/DC control unit 3 is adapted to keep the voltage VREG constant. Hereby, the line voltage VRL will instead be reduced in correspondence to the sum of the increases of the voltages VA and VB to accomodate the increased AC signal amplitude. This embodiment is schematically illustrated by the diagram in FIG. 4.

When the instantaneous value of the signal on the A-wire is reduced so that va<VTHA, this change will be detected by the comparator 12. The output signal from the comparator 12 will be forwarded by the OR-portion of the AND/OR circuit 9 to the control input terminal 83 of the controlled current generator 8. In this situation, the current generator 8 will be turned off. Now, the transconductance amplifier 7 will note that the voltage VA on the A-wire on its input terminal 71 is lower than the voltage VREF on its input terminal 72. As a consequence hereof, the transconductance amplifier 7 will supply current via its output terminal 73 to the node C. Thus, the voltage in node C will increase. This voltage increase in node C will be sensed by the AC/DC control unit 3 via its input terminal 32, and the AC/DC control unit 3 will reduce the voltages VA and VB accordingly to automatically adapt the signal headroom to the new AC signal situation.

In the embodiment according to FIG. 3, where the line voltage VRL is kept constant, the voltage VREG will be increased, while in the embodiment according to FIG. 4, where the voltage VREG is kept constant, the line voltage VRL will be decreased.

Thus, a change of the voltages VA and VB will result in a change of either the the voltage VREG or the line voltage VRL in correspondence to the sum of the changes of the voltages VA and VB.

It is to be understood that the AC signal amplitudes on the B-wire equally well may be monitored. In such a case, the comparator 13 will compare the instantaneous value of the signal on the B-wire, i.e. vb, with the threshold voltage VTHB set by the voltage generator 11 for the B-wire. The output signal of the comparator 13 will be forwarded by the OR-portion of the AND/OR circuit 9 to the control input terminal 83 of the controlled current generator 8 in the same manner as described above in connection with the output signal of the comparator 12. Also, the AC/DC control unit 3 will operate in the same manner as described above.

As an alternative, the AC signal amplitudes on both the A-wire and the B-wire may be monitored. In such a case, the AND-portion of the AND/OR circuit 9 would receive the output signals of both the comparator 12 and the comparator 13. The output signal from the AND-portion would then be applied to the control input terminal 83 of the controlled current generator 8 which would draw current from the node C or be turned off depending on the AC amplitude situation.

As should be apparent from the above, the subscriber line interface circuit according to the invention automatically adapts the signal headroom to different AC signal amplitude requirements.

What is claimed is:

1. A method for controlling the signal headroom of AC signals transmitted on one or both wires of a two-wire subscriber line connected to a subscriber line interface circuit, comprising the steps of:

applying a first DC line voltage to the first wire, wherein the first DC line voltage is between a first DC supply voltage and a second DC supply voltage, setting an AC signal threshold voltage between the first DC supply voltage and the first DC line voltage, and controlling the voltage difference between the first DC supply voltage and the first DC line voltage, when the voltage of the first wire equals the AC signal threshold voltage.

2. The method according to claim 1, further comprising the steps of:

applying a second DC line voltage to the second wire, wherein the second DC line voltage is between the first DC supply voltage and the second DC supply voltage, controlling the second DC supply voltage in relation to the sum of a change in the voltage difference between the first DC supply voltage and the first DC line voltage, and a change in the voltage difference between the second DC line voltage and the second DC supply voltage.

3. The method according to claim 2 wherein the voltage difference between the first DC line voltage and the second DC line voltage remains constant.

4. The method according to claim 1, further comprising the steps of:

applying a second DC line voltage to the second wire, wherein the second DC line voltage is between the first DC supply voltage and the second DC supply voltage, and controlling the voltage difference between the first DC line voltage and the second DC line voltage in relation to the sum of a change in the voltage difference between the first DC supply voltage and the first DC line voltage, and a change in the voltage difference between the second DC line voltage and the second DC supply voltage.

5. The method according to claim 4 wherein the first DC supply voltage and the second DC supply voltage remain constant.

6. A subscriber line interface circuit comprising:

a threshold voltage source coupled to a first DC supply voltage, and which determines a threshold voltage having a value between the first DC supply voltage and a first DC line voltage, and a voltage control circuit coupled to a first wire of a two-wire subscriber line, and which controls the voltage difference between the first DC supply voltage and the first DC line voltage when the voltage of the signal on the first wire equals the threshold voltage.

7. The subscriber line interface circuit according to claim 6, wherein the voltage control circuit controls a second DC supply voltage in relation to the sum of a change in the voltage difference between the first DC supply voltage and the first DC line voltage, and a change in the voltage difference between a second DC line voltage and the second DC supply voltage.

8. The subscriber line interface circuit according to claim 7 wherein the voltage difference between the first DC line voltage and the second DC line voltage remains constant.

9. The subscriber line interface circuit according to claim 6, wherein the voltage control circuit controls a voltage difference between the first DC line voltage and a second DC line voltage in relation to the sum of a change in the voltage difference between the first DC supply voltage and the first DC line voltage, and a change in the voltage difference between the second DC line voltage and the second DC supply voltage.

10. The subscriber line interface circuit according to claim 9 wherein the first DC supply voltage and the second DC supply voltage remain constant.

* * * * *